(12) United States Patent
Cochrane

(10) Patent No.: US 7,142,419 B2
(45) Date of Patent: Nov. 28, 2006

(54) LIFE EXTENSION IN HARD DISK DRIVES THROUGH VIBRATION DAMPENING USING PRE-STRESSED POLYMER SPRINGS

(75) Inventor: Paul Douglas Cochrane, Discovery Bay, CA (US)

(73) Assignee: StealthDrive LLC, Alexandria, VA (US)

( * ) Notice: Subject to any disclaimer, the term of this patent is extended or adjusted under 35 U.S.C. 154(b) by 0 days.

(21) Appl. No.: 10/924,339

(22) Filed: Aug. 23, 2004

(65) Prior Publication Data

US 2005/0207059 A1 Sep. 22, 2005

Related U.S. Application Data

(60) Provisional application No. 60/554,364, filed on Mar. 19, 2004.

(51) Int. Cl.
*G06F 1/16* (2006.01)

(52) U.S. Cl. .................................................. 361/685

(58) Field of Classification Search ................ 361/685, 361/97.02; 369/75.1, 75.2, 76, 77.1, 77.2, 369/78, 79, 80, 81, 82
See application file for complete search history.

(56) References Cited

U.S. PATENT DOCUMENTS

| | | | | |
|---|---|---|---|---|
| 6,084,768 A | * | 7/2000 | Bolognia | 361/685 |
| 6,154,361 A | * | 11/2000 | Anderson et al. | 361/685 |
| 6,498,722 B1 | * | 12/2002 | Stolz et al. | 361/685 |
| 6,580,604 B1 | * | 6/2003 | McAnally et al. | 361/685 |
| 2002/0131226 A1 | * | 9/2002 | Oldfield et al. | 361/212 |
| 2003/0102785 A1 | * | 6/2003 | Tsai et al. | 312/223.1 |

* cited by examiner

*Primary Examiner*—Lisa Lea-Edmonds
(74) *Attorney, Agent, or Firm*—David Bogart Dort; Raymond Ho; Dort IP PLLC

(57) ABSTRACT

A hard drive haven system for hard drives in a multiple environment that meets thermal, structural, interconnect ability, reliability, and mechanical integrity as is mandated for the life of a hard drive. The inventive device, as illustrated, is made from polymer materials that enhance vibration absorption, and acoustic noise. This inventive device will reduce the cost of metal solutions as well.

20 Claims, 9 Drawing Sheets

LIFE EXTENSION IN HARD DISK DRIVES THROUGH VIBRATION DAMPENING USING PRE-STRESSED POLYMER SPRINGS

REFERENCE TO PRIORITY DOCUMENTS

The present application claims priority under 35 USC .sctn. 119(e) to U.S. Provisional Application Ser. No. 60/554,364 entitled HARD DRIVE HAVEN and filed on Mar. 19, 2004, which is hereby incorporated by reference for all purposes.

BACKGROUND

During operation, the HDDs generate create vibration as they rotate. By definition, a hard drive system will undergo rotational vibration when an oscillating moment is applied. When a hard disk drive is idle, the oscillation can be caused by friction in the spindle bearings or by rotational imbalance of the platter(s). When the drive is under read/write or seek conditions, inertia forces from activity of the actuator arm can cause rotational vibration (RV) is characterized by rad/s, which is the rotational analog of linear acceleration m/s2 or g. When HDDs are packaged in close proximity they can, and most often will, propagate RV from one drive to another degrading drive performance. The vibration can become excessive, particularly when adjacent HDDs are operated simultaneously. Moreover, as HDD technology progresses to faster rotational speeds and cost-reduction architectures, the vibration problems are exacerbated.

In addition to the drive-to-drive induced vibration, there is also the real possibility of vibration being induced by the environment in which the drives are located. As an example of this would be in a data closet, where network storage equipment is maintained, there could be a number of external sources that can induce vibration. An air conditioner in any relatively near location would be a specific example.

Vibration can also come in the form of acoustic vibration or the HDDs can produce disturbing acoustic noise, particularly for the consumer product applications. As personal computer become more prevalent in the home and HDDs are being used for audio/video and entertainment applications, acoustic noise emissions are becoming important to consumers. Another factor in determine performance is acoustic noise by the HDD. For example, research has found that the leading question by consumers with respect to hard drives was "How loud will this drive be in my system? The acoustic noise comes from two noise generally comes from two sources.

Excessive vibration may lead to decreased HDD performance such as recoverable and non-recoverable write inhibits, increased seek times, and increased read and write access times. Excessive vibration or shock may also cause premature HDD failures that are not repairable. Examples include mechanically-damaged platters and read/write heads, mechanical wear on moving HDD components, and data error defects that cannot be corrected through the use of software tools. Also many HDDs in a confined space results in a substantial amount of heat generation. This heat must be dissipated in order to avoid over heating the HDDs and causing shortened product life.

Currently, there is a void in the market as far as a complete solution that addresses vibration, thermal, and all other physical issues (mass, structure . . . ) for hard drives. The proliferation of hard drives is growing rapidly. The typical CAGR (compound annual growth rate) for the various segments of the Storage Area Network (SAN) and Network Attached Storage (NAS) arenas are growing at an .about.67% (typical). An increase in HDD performance will have a significant effect when considering the tremendous numbers of drives in operation.

Much of the HDD industry continues to ignore the threat of damaging vibration as failure rates become exceedingly high and grasp at ineffective solutions. The nature of almost all problems is the need to resolve opposing constraints. The constraints invariably pull any of the possible solutions to a problem in different directions. Almost without fail, all solutions find that in improving one problem constraint that they diminish the solution from the aspect of one, or more, of the other imposed constraints. The position of making trade-offs and finding a "balance" of the capabilities needed to satisfy the need(s). An example of a potential solution that attempts to partially address the above-listed problems is included in US Patent Publication No. 2003/0222550 (U.S. application Ser. No. 10/417,111 filed Apr. 17, 2003), invented by Boswell et. al and currently assigned to Xyratex Ltd. of Great Britain, which is hereby incorporated by reference for all purposes. However, the Boswell teachings do not fully address many of the relevant issues discussed above.

SUMMARY

In view of the foregoing disadvantages in the known types of hard drive storage systems, the present invention provides a new solution wherein the same can be utilized for the storage of multiple hard drives.

The present invention includes a packaging solution for hard disk drives that is a comprehensive embodiment promoting long term, reliable hard disk drive performance. The present invention not only completely addresses hard disk drive packaging requirements, but in particular embodiments provides a highly cost effective solution in the packaging and manufacture of hard disk drives in multiple markets. The solution provided by particular embodiments of the invention can be implemented for any number of hard drives, individually, or in any multi-disk configuration. The device embodying a preferred embodiment of the present invention for use in the hard disk drive market, will be referred to as the Hard Drive Haven™ (also referred to as HDH™) in the present application. Although many solutions look to improve the drives performance, HDH™, instead, offers to provide an environment that the drive will not need to improve, as the threats will be so greatly diminished.

The present invention is generally applicable to hard disk drives in its preferred embodiments and more specifically it relates to an all encompassing solution for the storage of hard drives in a single or multi-hard drive environment. Although the invention primary envisioned for use with hard disk drives, the inventive concepts disclosed herein extend into many other industrial, commercial and personal applications in other alternate embodiments, without departing from the spirit and scope of the invention.

The present invention takes advantage of the properties of carefully selected dampening materials by considering the polymer science, making the Hard Drive Haven™ an excellent HDD environment. The Hard Drive Haven™ provides an optimum HDD packaging for long term and reliable operation. As can be appreciated by those skilled in the art, the proper composition and configuration of materials used in the Hard Drive Haven™ is determined through analysis and resolution of vibration and resultant noise in the hard disk drives. Such analysis requires advanced techniques in modeling, analysis and testing, as well as consideration in the relevant materials technologies.

In a first and primary embodiment, the HDH™ is made of polymer which serves as a dampening device to minimize vibration, but also provides a thermal advantage, because it is a reduced-space or "footprint" solution, which also leaves as more open air maximizing air flow volume for cooling the HDDs.

The hard disk drives (HDD) are mounted in various embodiments of the Hard Drive Haven™ in a wide range of devices and physical locations from personal computers to Storage Area Networks (SAN) to Network Attached Storage (NAS) appliances, such as Redundant Array of Inexpensive Disks (RAID) arrays, Just a Box of Disks (JBODs), servers and a host of bulk data memory devices. HDD bay or chassis located within a system enclosure in a personal computer, in a JBOD, or any other location where the HDH™ could be easily installed.

The present invention addresses many of the constraints involved in the packaging of HDDs, while simultaneously improving many performance indicators. The Haven offers a complete benign environment for a hard drive.

The following list articulates a number of attributes, inter alia, that describe some of the feature and advantages of certain embodiment of the invention as embodied in the Hard Drive Haven™. All of the attributes listed apply to the performance, handling, distribution and long term reliability of hard drives. However, the list would be a very appealing list to many other applications for which the HDH™ could be easily adapted.

The invention provides for a low cost of manufacturing and low product cost (initial tooling cost has been calculated to be a one day payback for a $50,000 tool based on extreme market demand and the piece part cost would be exceptionally low as compared to most existing alternatives—injection molding process is most likely, but not the only possibility).

Minimal part count, light weight and application flexible

Thermal Environment—minimal structure allowing maximum cross section for cooling air flow Vibration & Shock Isolation and Damping Minimal Packaging Complexity—with maximum hard drive density Acoustic Noise Reduction High Mechanical Integrity Structural Stability and Efficiency Minimal Mass (Mass Efficiency)—important in that HDDs are massive and the loads on data-com equipment racks will go up sharply with densely packaged hard drives, particularly if the packaging weight is not minimized.

Reliable Interconnect (Hot Plug)—Intelligent use of forces to create simple, highly reliable connector alignment, with no mechanical piece parts Improvements in electrostatic discharge Ground isolation, advance pins on hot plug handle the discharge of any discharge.

Simple field replacement ability—could even ship hard drives in OEM packaging for direct installation in the SAN and NAS.

Simple Field Serviceability—Drive Level Replacement (with no additional replacement components)

Designed for minimal field service

The industrial design is facilitated by existing faceplate design and snap fit features for assembly into the HDH™.

The present invention provides the disk drive industry with an improved hard drive storage system that has many of the advantages of the HDH™ mentioned above but also include:

has no mechanical parts, and no electro-mechanics and provide exceptional performance.

allows the airflow passages are optimized.

provides an excellent thermal environment.

reduces vibration (external and drive to drive, RV), shock, and acoustic noise.

allows ease of distribution and replacement for hard drives in the field (shipped in original packaging).

structurally sound and minimizes mass.

provides electrostatic discharge and electrical grounding isolation for the HDDs.

t allows for highly reliable interconnect without the need for any mechanical alignment features.

low cost overall Solution for the packaging of hard drives.

completely snap fit assemble.

manage polymers in a vibration damping environment that has exceptional durability. This by using a variety of beam elements that work in unison to off load and not allow the over stressing of any other beams in the structure;

provide a common platform for mounting of hard drives to provide a predictable, benign and fully optimized solution to promote long term reliable hard drive performance.

standardize this platform in order to better compile consistent data of hard drive performance to continue to drive the technology to greater levels of capacity and performance.

provide the first complete solution for hard drives, from the manufacturer to end of life of each individual hard drive.

BRIEF DESCRIPTION OF THE DRAWINGS

The features and attendant advantages of the present invention will become fully appreciated as the same becomes better understood when considered in conjunction with the accompanying drawings, in which like reference characters designate the same or similar parts throughout the several views, and wherein. Please note that the drawings shown here are of the least complex beam structures, as this demonstrates the principle most clearly. There are a great range of beam cross sections and combinations that are under analysis and being shaped to optimize the Haven's performance. In later pages there will be drawings of a number of beam shapes and combinations rendered to demonstrate a small sample of the wide range of form factors that could and will be used to satisfy the needs of hard drives and other devices needing an environmental Haven.

DETAILED DESCRIPTION OF THE INVENTION

Figure 1:
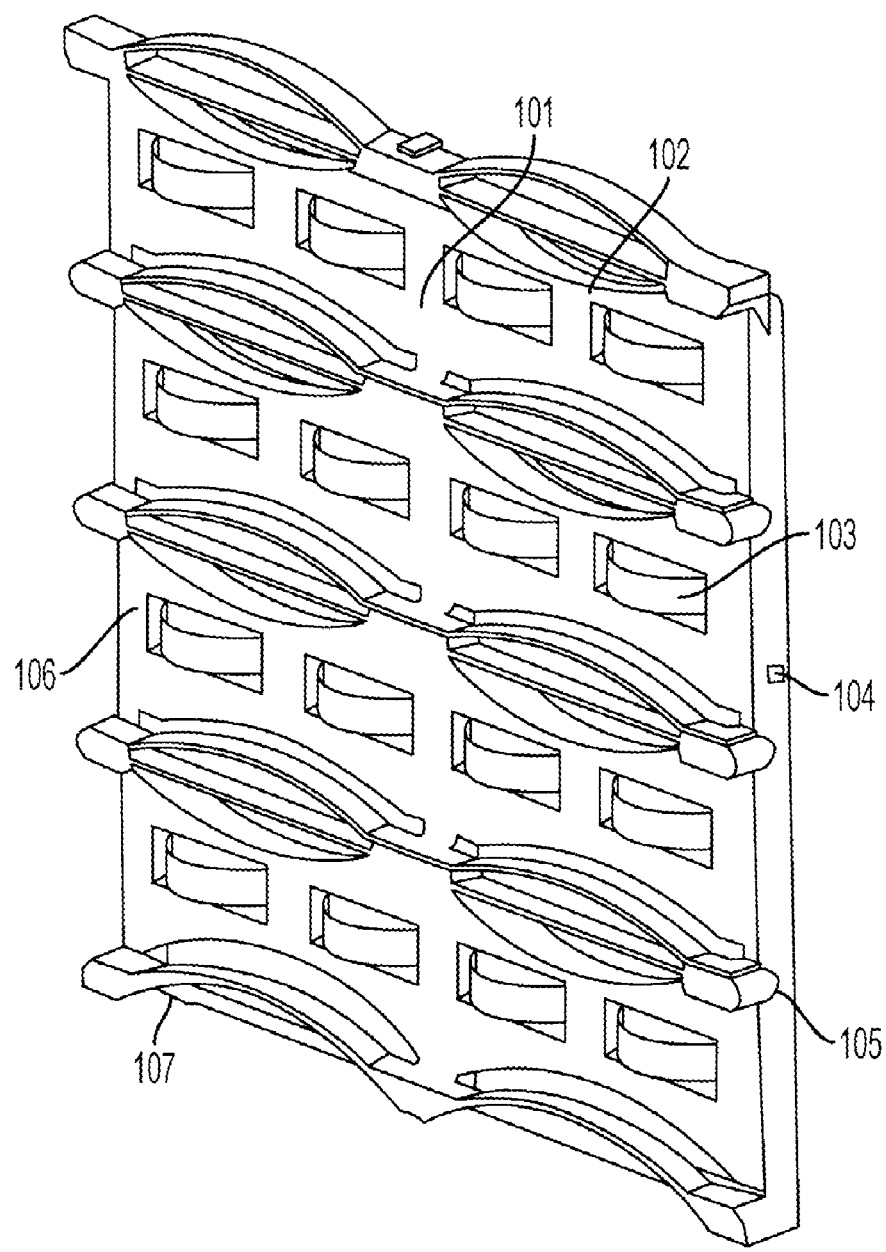
FIG. 1 is a perspective view of the present invention.

Turning now descriptively to the drawings, in which like reference characters generally denote similar elements throughout the several views, the attached figures illustrate a hard drive mounting structure which is comprised of a polymer and which will be discussed more fully below.

In the following disclosure, the preferred embodiment of the present invention will be referred to by one of its trade names the "Hard Drive Haven"™. The Hard Drive Haven™ has a vibration dampening system that will damp vibration to and from other co-located hard drives and/or from external excitations from the local environment. The vibration that is created from other hard drives is referred to as RV, which stands for Rotational Vibration. Hard drive have rotating platters and this rotational energy can be transmitted from one hard drive to another and cause the receiving drive to experience a drop in performance. The hard drive Haven will utilize a very carefully structured series of beams that will combine in damping out vibration and acoustic noise over a wide range of frequencies and energy levels. The vibration dampening features will be molded from the structure that also serve as the support structure for the hard drives and as a stiffening system for the computer, server, storage array, digital recorder, desktop hard drive enclosure and many other possible applications. The focus herein is on hard drives but the application of this solution is extendable to any number of devices that are benefited be having vibration, shock and acoustic vibration damped from their operating environment.

The present invention takes advantage of the fact that many Polymer composites have been found to have excellent damping properties that can be used to help control any unwanted vibrations produced by external dynamic loading. Moreover, the great flexibility available in composite structures through changing both materials and designs can be used to alter damping and resonance properties in desirable ways. See enclosed documents regarding these composites.

Examples of appropriate polymers for computer applications include Delrin, Celanese, and Celstran. There are many polymers that offer the properties that will be required for the hard drive haven. Ultem, Valox and Noryl are three such polymers, as examples. Careful analysis, including finite element modeling will be necessary to ensure that the polymer(s) used can withstand the test of time and not yield as a result of creep and/or fatigue. In order to facilitate implementation of many possible embodiments of the invention, references relating to the properties of polymers are incorporated herein. These publications include *The Handbook of Materials Science* published by McGraw-Hill. Additionally, the series by Bill Fry and published by the Society of Manufacturing Engineers Speaking of Plastics Manufacturing (1999), Working with Acrylic, Working with Vinyl, etc. may also be useful in determining the relevant properties of plastics and polymers in the manufacturing process of the present invention and is incorporated by reference.

The illustration included herein reflect only a few of the possible beam structures that can be employed by the Hard Drive Haven™. The HDH is designed to be capable of responding to a great number of inputs and damping out the negative effects of vibration, by having one beam support another and another support another, etc. With no beam being stressed and or strained past the limits of the material used ensuring that the HDH prevails for the life of the product. The inventive suspension system holds the hard drive in a slot in the housing with the polymer springs. The polymer springs isolate the hard drive from the side panels and dampens the vibration produced by the hard drive itself as well as the vibrations transmitted through the sidewalls of the hard drive bay housing. The springs provide constraint and damping in an omni-directional manner, negating the adverse effects of vibration and acoustic noise from any conceivable source within the operating environment.

Figure 5:
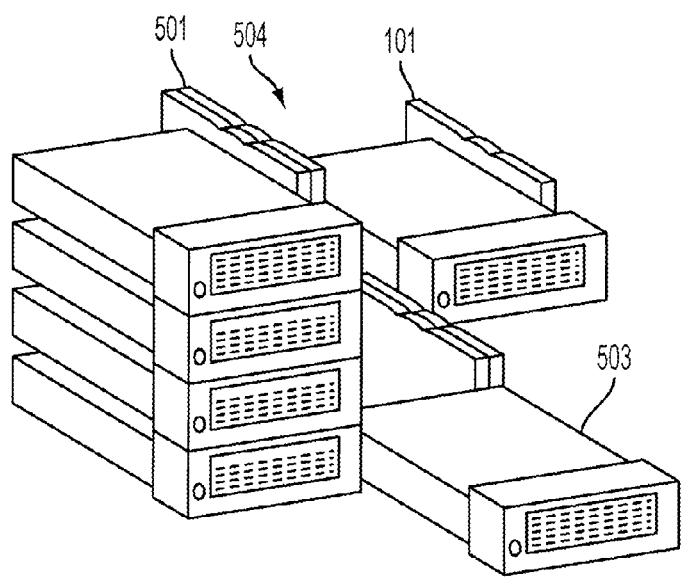
FIG. 5 is a partially exploded view of the present invention.

Referring to FIG. 1, a primary embodiment of the invention is illustrated and includes a side panel 101 of a housing that incorporates an embodiment of the inventive hard drive suspension system. A second side panel is mounted in parallel (501 as shown in FIG. 5) with the illustrated panel so that both sides of the hard drives are in contact with the polymer springs. In the illustrated embodiment (which is only one configuration of many possible, single drive up to as many as required by the application), there are slots 106 for four hard drives which are separated by dividers 105. The inventive suspension system comprises a polymer compression member which in this embodiment is an arched beam 102 that is incorporated into each of the dividers 105, contact the hard drives on the upper and lower surface of the devices. In addition there are compressive members 103 that contact the hard drives on the sides of the devices and compress as the drives are inserted into the hard drive haven. The beams are therefore in compression in both the vertical 102 and horizontal 103 axis of the hard drives and due to the nature of the forces that ill be encountered and the nature of the polymers will act as omni-directional; reactions to all forces. The actual hard drive haven will employ beams of similar conceptual design, but may be very different in form factor as a result of detailed finite analysis. The greatest likelihood is that multiple beams of varying stiffness will be employed to react the multiplicity of stimuli the hard drives will encounter in operation. The diagrams enclosed are therefore intended to represent the concept and do so from a fundamental conceptual point of view. The multi stiffness beams will be designed to work in unison with each other being recruited as the load becomes more aggressive, for example in shock, but not allow the load to be too great on lesser strength beams before a stiffer load bearing beam is recruited.

Figure 2:
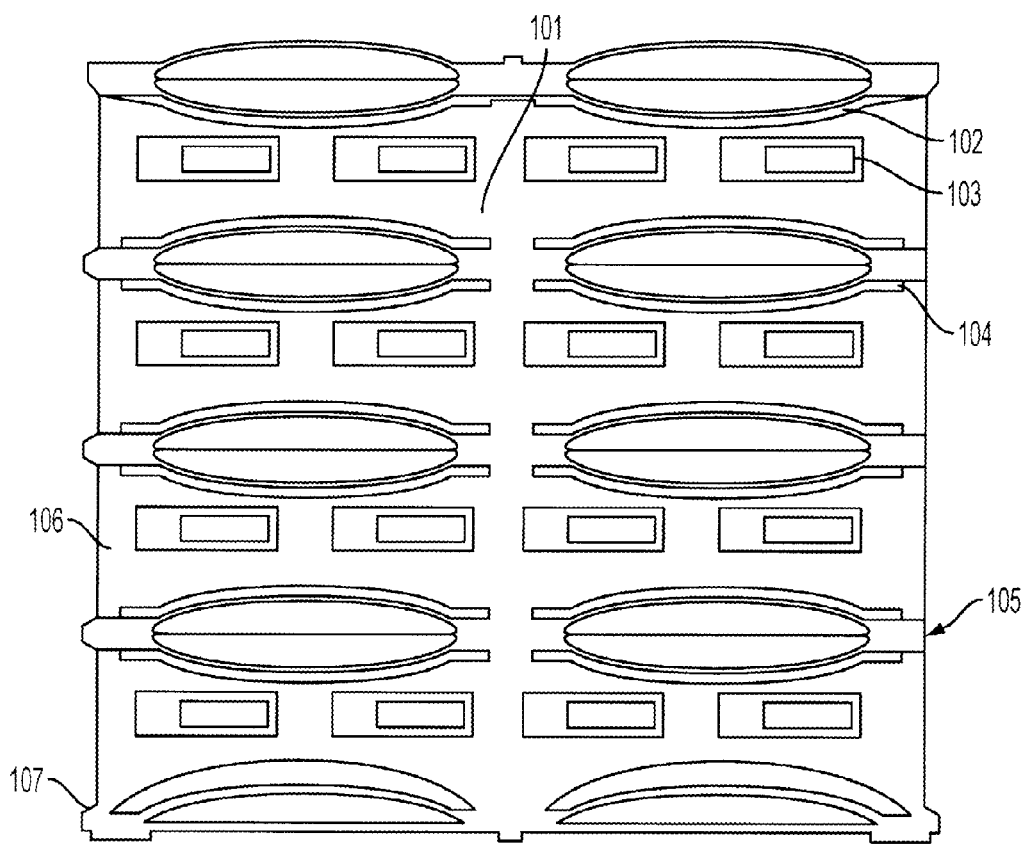
FIG. 2 is a front of the present invention showing all of the components.
Figure 3:
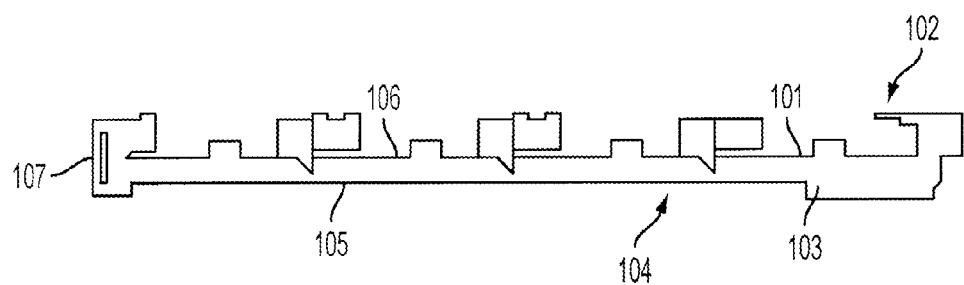
FIG. 3 is a side view of the present invention.
Figure 4:
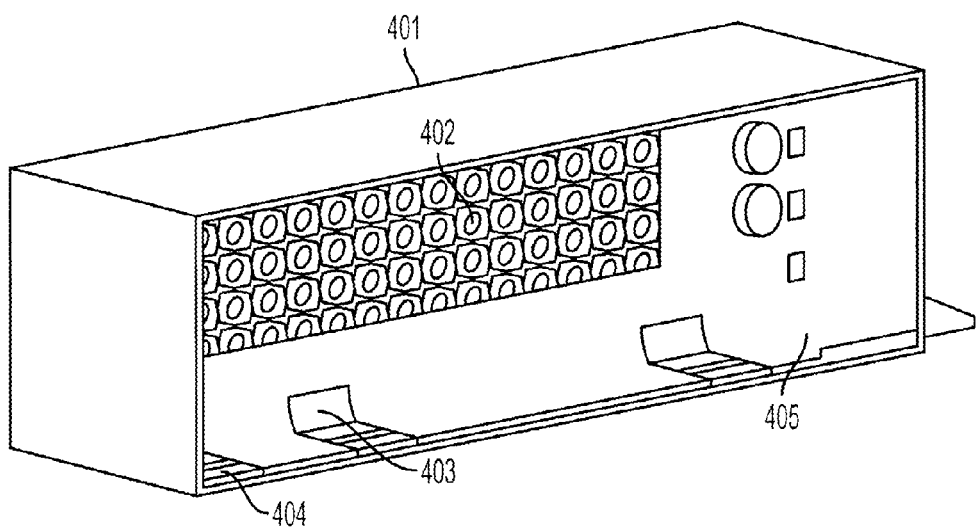
FIG. 4 is a perspective view of the faceplate interfaces to the drive and the present invention.

In a particular embodiment, the inventive suspension system also has springs or spring-like structures 103 that engage the sides of the hard drive. These springs are similar to the springs in the dividers 105 as described above, but are mounted in the center of the slots of the side panel 101. The side springs 103 are made of a flexible polymer and have an arched structure that is attached at the ends of the beam to the side panel. FIG. 2 illustrates the side panel from a front view, and FIG. 3 illustrates the side panel from a top side view.

The Hard Drive Haven™ also delivers a structurally efficient solution because of the strength to weight ratio of the materials chosen for use in the present invention. The molded plastics that are implemented in the present invention is greater than cold rolled steel, which is almost always used in such applications. For example, the mass of certain polymers is about ⅛ that of cold rolled steel. Increasing the strength to weight ratio is very important in implementing particular embodiments of the present invention, as the mass of the systems including multiple hard drives is increasing, and the "floor loading" of data centers will not be able to accommodate bays that are filled with such mass dense packaging.

In particular embodiments of the invention, the Hard Drive Haven™ also provides an assembly-conscious design that anticipates significantly reducing the effort required for manufacture. The Hard Drive Haven™ will "snap fit" into a sheet metal chassis. Reference 107 is a tongue (3 along the bottom of the bottom of the HDH and one at top center) that will fit into a slot in the sheet metal chassis (in the case where this is the final implementation). The top springs 102 will maintain the HDH in compression between the upper and lower sheet metal housing. The HDH also will include integral faceplates that provide a single snap-fit for the drive to the faceplate 403 and a single snap fit for the hard drive/faceplate combination in to the HDH 104/404. Therefore for applications (Enterprise or example) that HDH requires only three snap fit assembly steps for full HDH, hard Drive and faceplate assembly. With the use of metalized plastics that Electro-magnetic aspects of an enterprise solution can also be accommodated. It will often be necessary in enterprise applications to accommodate light pipes to provide optical feedback that the hard drives are operating correctly. These light pipes can easily be accommodated in the HDH side walls.

FIG. 5 shows an example assembly of eight hard drives. The hard drives can be mounted right side up or upside down (as shown) 503. System architecture will dictate the most prudent choice in this case. The HDH can package the drives in very close proximity, but provide the necessary cooling air, structural integrity, vibration/shock/acoustic damping, ease of assembly, and a multitude of other benefits that are all delivered at an exceptionally low cost.

At the present there are many companies packaging hard drives in closer and closer proximity with each other. There are metal boxes in metal boxes, in . . . the preferred embodiment of the invention requires virtually no packaging, accepts the drive into the shelf with nothing required but a faceplate. Such a packaging system leaves all of the cross-sectional area between the drives free for delivering cooling air. This is important not only for the proper operation of the drives, but it is also very important for other system components, downstream of the drives, these components, often containing processors, can reject a great deal of heat. It is critical that drives be well cooled, and that the portion of system they reside in is not so densely packaged so ass to slow the flow in the entire system. The HDH makes sure that as much of the critical airflow volume is available for the system components.

The inventive suspension system of the present invention has numerous cutouts in the side panels. These "holes" are generally located next to the tops and bottoms of the hard drives allowing air to more freely flow over the upper and lower surfaces. The increased air flow, allows the inventive system to more easily cool the stacked hard drives through convection heat transfer.

The thermal environment—it is a widely held opinion that the performance and length of time in which a hard drive will continue to function is inversely proportional to the temperature of the environment in which it operates. The actual degree to which the temperature is elevated is where the debate lies, but it is clear that the lower temperatures are better. With that said, one needs to understand the reality of where the hard drives will be deployed to realize that there in no good way to be certain of the ambient temperature that will be encountered and that this will be variable depending on what the final implementation is. Therefore, the drives will have to operate under a number of different environmental ambient temperature states. Since you cannot guarantee the temperature of the cooling air, then it is critical to guarantee that there is enough air to effectively remove the heat that the drive itself generates. I now include the first graphic to assist in the description of the intellectual property described herein. Please note that the majority of the hard drive market is moving rapidly toward very dense packaging of hard drives to provide low cost data storage solutions. The increasing packaging density and the ever increasing capacity of the hard drive (Upwards of 500 MB for one 3.5 inch HDD and climbing), making the thermal environment ever more aggressive for the hard drives and incrementally reducing the life expectancy of the hard drives. The need to get whatever little air possible to the drives and efficiently removing whatever heat possible is more critical that ever before. In order to help to demonstrate the manner in which the Hard Drive Haven addresses the thermal issues as well as many other aspects of hard drive packaging, the following diagram (FIG. 1—The Basic Form Fit & Function of the Hard Drive Haven) is submitted:

Disk drives are complex electromechanical devices that can suffer performance degradation or failures due to a single event or a combination of events occurring over time. Environmental conditions that affect drive reliability include ambient temperature, cooling air flow rate, voltage, duty cycle, shock/vibration, and relative humidity. Fortunately, it is possible to predict certain types of failures by measuring environmental conditions. One of the worst enemies of hard disk drives is heat. Within a drive, the reliability of both the electronics and the mechanics (such as the spindle motor and actuator bearings) degrades as temperature rises. Running any disk drive at extreme temperatures for long periods of time is detrimental and can eventually lead to permanent data loss.

Figure 6:
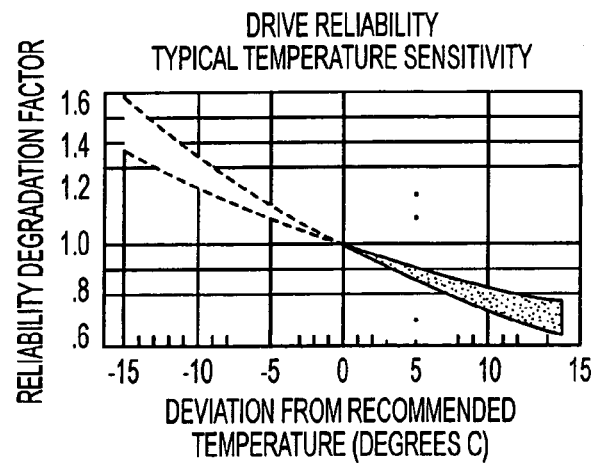
FIG. 6 is a chart that illustrates the relationship to temperature and disk drive performance.

FIG. 6 is The following paragraph, figure, paragraph comes from a white paper entitled "Hitachi's Drive Temperature Indicator Processor (Drive-TIP) helps ensure high drive reliability" by Gary Herbst, which is hereby incorporated by reference. To look at an example of the relationship between temperature and hard drive (MTBF=Mean Time Before Failure; HDD=Hard Disk Drive).

FIG. 6 shows the dramatic effect that temperature has on the overall reliability of a hard disk drive. Derivations from a nominal operating temperature (assumed to be maintained over the life of a drive) can result in a derivation from the nominal failure rate. As the temperature exceeds the recommended level, the failure rate increases two to three percent for every one degree rise above it. For example, a hard disk drive running for an extended period of time at five degrees above the recommended temperature can experience an increase in failure rate of 10 to 15 percent. Likewise, operating a drive below the recommended temperature can extend drive life.

Normal mounting systems rigidly attach the hard drive to the slots or bays of a storage unit with screws and sheet metal slot components that physically contact the hard drive. Because of this rigid connection outside vibration is transmitted to the drive and the vibrations produced by the hard drive are transmitted to other hard drives in the housing exacerbating the vibration problem. In contrast to a rigid connection, the inventive hard drive suspension system isolates the hard drive from the frame with polymer springs which effectively dampen the transmitted vibrations. The polymer springs allow the hard drive to move in all three axes.

In addition to vertical movement, the hard drive may also move from side to side or forward and backward in the slot. This freedom of movement results in reduced vibration transmitted to the hard drive from external sources. In addition to the mechanical spring properties, the polymer also has vibration absorption characteristics. In a normal spring, the physical energy resulting from compression is stored and released as the spring expands. In a preferred embodiment, the polymer springs are made of a material that absorbs some of the compression force and converts this energy into a different form. The energy may be converted into heat energy or alternatively, with a pizo-electric mechanism the physical energy can be converted into electrical energy.

Polymers are effective in their response to a variety of vibration related issues, including: absorption of airborne sound; blocking airborne sound; damping, and vibration isolation. The HDH™ will employ polymers, composites and other appropriate materials in addressing all these issues, in a manner that is cost effective and delivers all requisite HDD packaging needs.

Figure 7:
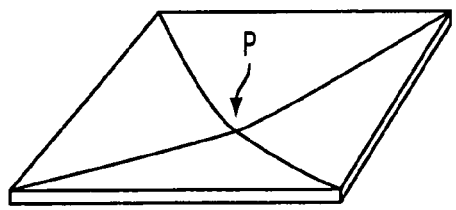
FIG. 7 is a representative example of the pre-stressed or load deflected compression polymer member.
Figure 8:
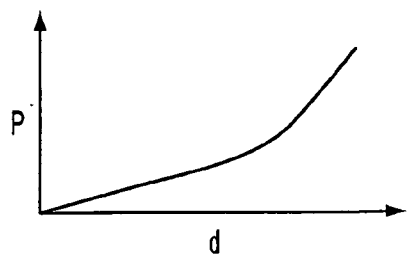
FIG. 8 shows the results of 7.
Figure 9:
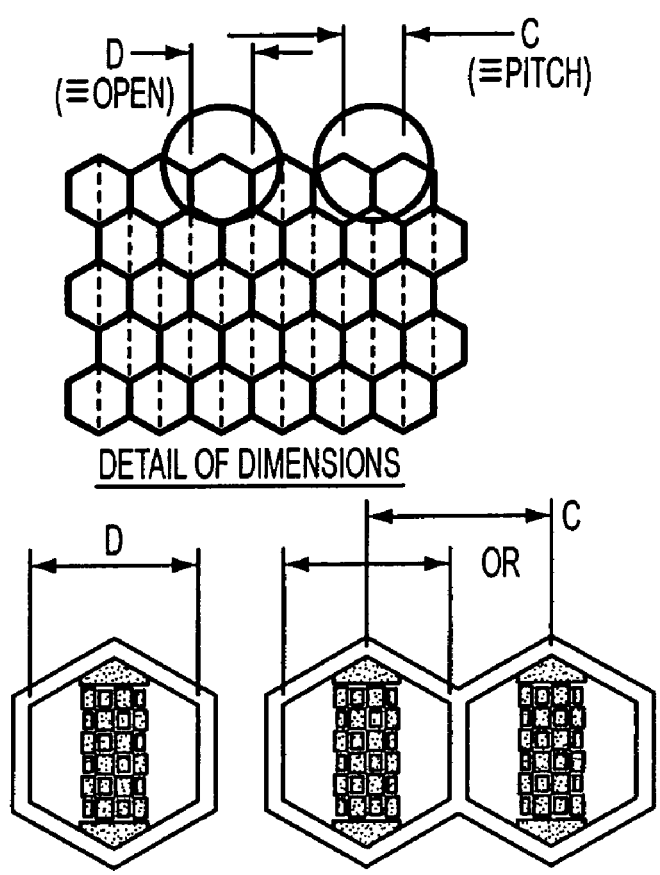
FIG. 9 illustrates the details present of the materials used in the present invention and their operation.
Figure 10:
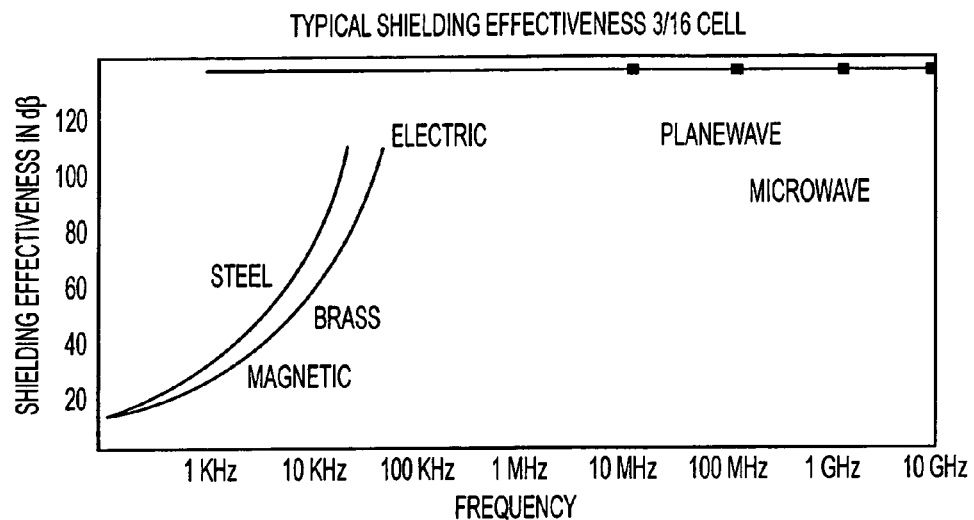
FIG. 10 illustrates shielding effectiveness.
Figure 11:
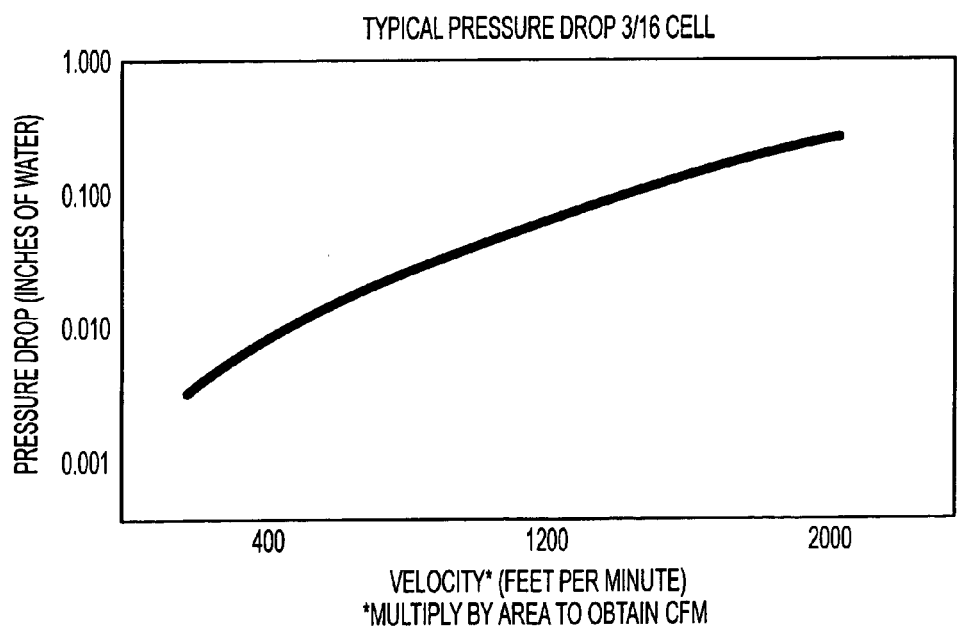
FIG. 11 illustrates pressure drop.
Figure 12:
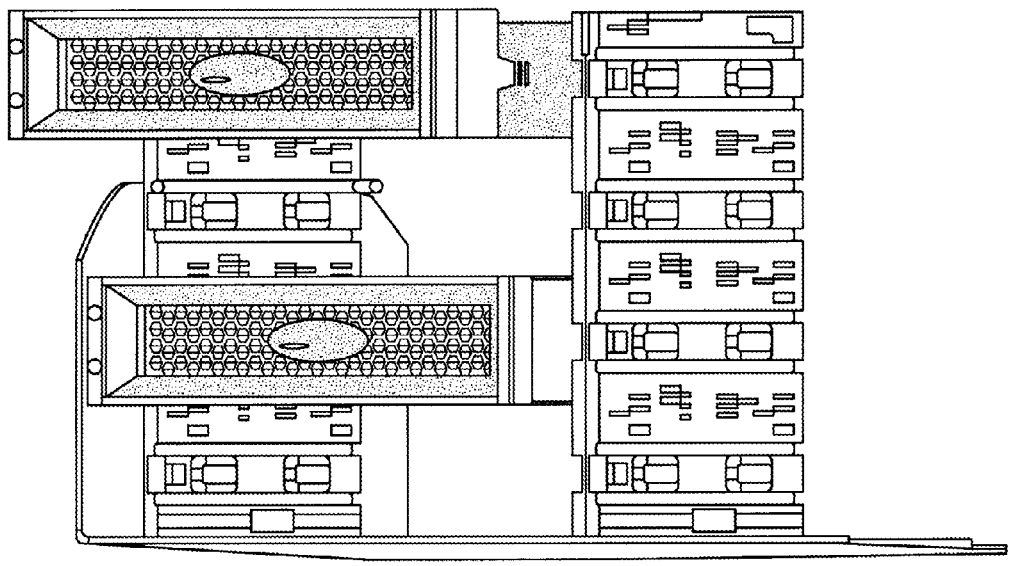
FIG. 12 shows a plurality of HDH as they may be implemented.

Referring now to FIGS. 7 and 8, a load deflection treatment and stiffening effect is shown. The stiffening effect results from the fact that the thin wall is stretched into tension as the plate deflects at P. The load deflection shown in FIG. 7, illustrates this phenomenon with the results shown in FIG. 8. For effective vibration control, it is often desirable to have a response that provides greater stiffness as the load increases. The behavior of membrane or shell stiffness, in polymers, provides this behavior without incremental cost. Simple it is a function of the geometry. With proper material selection, the cross section can be matched to the expected loading of the application. Diaphragm stiffening is a non-linear increase in stiffness resulting from a change in curvature of a part. This effect is particularly pronounced when fixed boundary conditions are used.

There are a variety of different materials that can be utilized depending on the devices form factors, level of damping required and the magnitude of the input forcing function. Diaphragm stiffening is a nonlinear increase in stiffness resulting from a change in curvature of a part. This effect is particularly pronounced when fixed boundary conditions are used.

Figure 13:
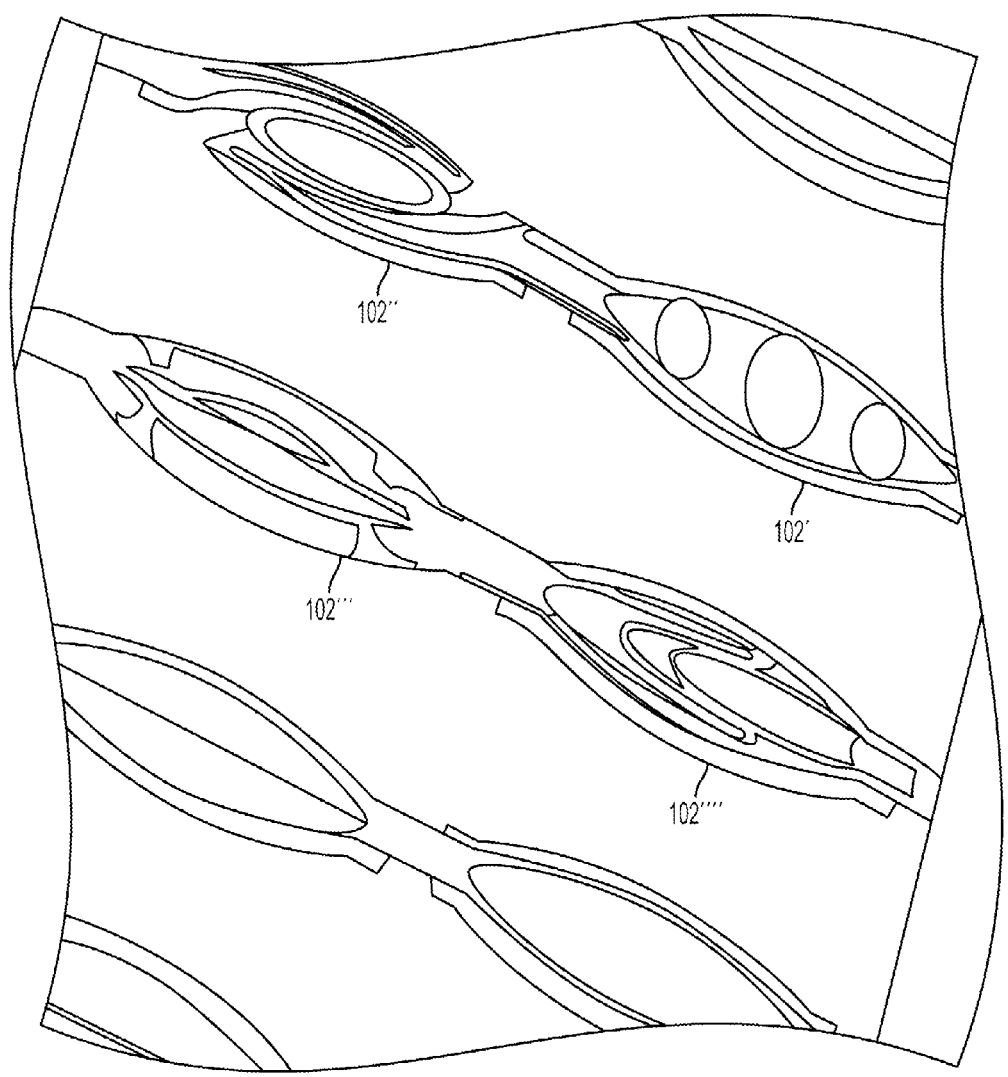
FIG. 13 shows various optional features of the polymer compression members.

FIG. 13 shows a number of conceptualizations of the types of spring features 102'. 102", 102''', 102'''', include several types of coils, that might be used of the present invention.

Table B, provides information on examples of polymers that might be employed for the Hard Drive Haven™, Demonstrating the properties that are required to deliver the performance necessary for the life of the systems in which the HDH™ will be employed. Data sheets of polymers that may be applicable to this invention, which are hereby incorporated by reference, and include some of the materials described below in Appendix A.

Materials from Dupont include, DELRIN® . . . versatility in design, moulding and performance . . . 6, HYTREL® . . . a thermoplastic and an elastomer all in one . . . 8, ZYTEL® glass-reinforced . . . don't settle for ordinary glass-reinforced nylon . . . 20

The appropriate materials appropriate for use in the present invention and available from GE include the various types of, Noryl, Ultem and Valox. A list of available materials from GE that may be appropriate for use in the present invention is available at the GE POLYMERLAND—NORTH AMERICA internet site.

Other entities that manufacture the types of plastics and polymers include Parker-Hannefin, such as nickel-plated carbon-fiber, BASF, and others referenced in Appendix A.

Simplified, lower mass and higher strength structures. Reduced packaging complexity, with increased reliability, serviceability, and ease of assemble. Ease of integration of industrial design features, ease of shipping replacements (could use the HDH™ or if not send drives in their original packaging and pop on a face plate at the site and slide into the HDH™).

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

While the invention has been shown or described in only some of its forms, it should be apparent to those skilled in the art that it is not so limited, but is susceptible to various changes without departing from the cope of the invention. For example, the dampening materials may be formed from a thin film, sheet, molded or a combination thereof, and may be placed at a variety of interfaces to further reduce vibration and shock.

Having thus described my invention, I claim:

1. A unit for storing at least one hard disk drive, including: two side panels mounted in parallel with each other, such that both sides of said at least one hard disk drive is in contact with a suspension system; a set of slots for a plurality of hard drives separated by dividers each of said dividers defining an upper and lower surface, said number of slots corresponding to said number of disk drives; said suspension system comprising a polymer compression member incorporated into each of said dividers; wherein each of said polymer compression members contacts each of said disk drives at said upper and lower surfaces.

2. The unit for storing at least one hard disk drive as recited in claim 1, wherein said polymer compression member is an arched beam that is incorporated into each of said dividers.

3. The unit for storing at least one hard disk drive as recited in claim 2, wherein said multiple beams are configured to each have a different stiffness.

4. The unit for storing at least one hard disk drive as recited in claim 1, wherein said polymer compression member includes a material chosen from the group consisting of valox, deirin, hytrel, zytel, or noryl.

5. The unit for storing at least one hard disk drive as recited in claim 1, wherein there is more than one set of said polymer springs said set of polymer springs made of at least two different materials.

6. The unit for storing at least one hard disk drive as recited in claim 1, wherein said compression member is configured as a coil.

7. The unit for storing at least one hard disk drive as recited in claim 1, wherein said compression member is configured two linearly adjacent arches.

8. The unit for storing at least one hard disk drive as recited in claim 1, wherein said compression member is configured as multiple arches.

9. The unit for storing at least one hard disk drive as recited in claim 1, wherein a vertical compression member contacts the hard drives on the upper and lower surface of the devices.

10. The unit for storing at least one hard disk drive as recited in claim 1, further comprising at least one complementary compressive member contacting said at least one hard drive on the sides of the devices, such that they engage the sides of the hard drive.

11. The unit for storing at least one hard disk drive as recited in claim 10, wherein said at least one complementary compressive member is mounted in the center of the slots of said side panel.

12. The unit for storing at least one hard disk drive as recited in claim 11 wherein said at least one complementary compression member is made of a flexible polymer and have an arched structure that is attached at the ends of the beam to the side panel.

13. The unit for storing at least one hard disk drive as recited in claim 12, wherein said polymers will act as omni-directional reactions to all forces.

14. A unit for storing at least one hard disk drive, including: two side panels mounted in parallel with each other, such that both sides of said at least one hard disk drive is in contact with a suspension system; a set of slots for a plurality of hard drives separated by dividers, said number of slots corresponding to said number of disk drives; said suspension system comprising at set of polymer compression members incorporated into each of said dividers; each of said dividers defining an upper and lower surface, and wherein each of said polymer compression members contacts each of said disk drives at said upper and lower surfaces; and wherein said multiple compression members are configured to have varying stiffness.

15. A method for reducing the vibration in a hard disk drive using the system as recited in claim 14, including the step of configuring said multi-stiffness compression members to work in unison with at least another of one of said of beams.

16. A system for housing a hard disk drive including: a first and second side panel of a housing, said second side panel mounted in parallel with the said said first side panel; wherein said first and second side panels having at least one slot for including at least one disk drive; a first set of compressive members made of a polymer, and configured such that both the top and bottom of said at least one disk drive is each contacted by at least compressive member; and a second set of compressive members made of a polymer, and configured such that both of said sides of said at least one disk drives are in contact with said-second set set of polymer compressive members; wherein said at least one disk drive is held firmly in place by said first and said second sets of compressive members, whereby said rotational and external vibrations are reduced.

17. The system as recited in claim 16, further including a set of slots which are separated by dividers.

18. The system as recited in claim 16, wherein said first polymer compression member is an arched beam.

19. The system as recited in claim 18, wherein at least said first set of compressive members includes beams of varying stiffness.

20. The system as recited in claim 19, wherein said beams of varying stiffness are configured to work in unison.

* * * * *